United States Patent [19]

Ohtsuka

[11] Patent Number: 5,039,987
[45] Date of Patent: Aug. 13, 1991

[54] CIRCUIT FOR CONVERTING A PHASE SIGNAL TO AN AMPLITUDE SIGNAL

[75] Inventor: Isao Ohtsuka, Tokyo, Japan

[73] Assignee: NEC Corporation, Tokyo, Japan

[21] Appl. No.: 463,031

[22] Filed: Jan. 10, 1990

[30] Foreign Application Priority Data

Jan. 10, 1989 [JP] Japan .................................. 1-4339

[51] Int. Cl.⁵ .............................................. H03M 1/48
[52] U.S. Cl. ..................................... 341/111; 341/117
[58] Field of Search ................ 341/111, 140; 332/117, 332/144, 149

[56] References Cited

U.S. PATENT DOCUMENTS

| | | | |
|---|---|---|---|
| 4,270,177 | 5/1981 | Endoh et al. ........................ | 341/140 |
| 4,331,941 | 5/1982 | Kovalick et al. ................... | 332/149 |
| 4,562,414 | 12/1985 | Linder et al. ........................ | 332/117 |
| 4,628,286 | 12/1986 | Nossen ................................. | 332/144 |
| 4,672,634 | 6/1987 | Chung et al. ........................ | 332/144 |
| 4,843,613 | 6/1989 | Crowle ................................. | 332/117 |

Primary Examiner—William M. Shoop, Jr.
Assistant Examiner—Helen Kim
Attorney, Agent, or Firm—Helfgott & Karas

[57] ABSTRACT

A circuit for converting a phase signal to an amplitude signal comprises a signal separating circuit which receives a phase signal and provides in accordance therewith a phase conversion signal and a sign signal, and a conversion unit including a conversion table in which a predetermined signal wave in a reference phase angle range is stored. A phase angle of a phase signal is converted into a converted phase angle, when the phase angle is outside a reference phase angle range. An amplitude signal is obtained by reading an amplitude based on the phase angle or the phase converted angle from the conversion unit.

5 Claims, 5 Drawing Sheets

CIRCUIT FOR CONVERTING A PHASE SIGNAL TO AN AMPLITUDE SIGNAL

FIELD OF THE INVENTION

The invention relates to a circuit for converting a phase signal to an amplitude signal, and more particularly, to a circuit for converting a phase signal to an amplitude signal in which a Sine look-up table ROM is used in a conversion unit.

BACKGROUND OF THE INVENTION

One type of a conventional circuit for converting a phase signal to an amplitude signal is included, for instance, in a digital frequency modulator. The circuit for converting a phase signal to an amplitude signal has been described on pages 355 to 361 of "IEEE Transactions on Consumer Electronics, Vol. CE-32, No. 3, August 1986," and comprises a Sine look-up table ROM, in which amplitude data of one period sinusoidal wave at addresses of 0 to $2\pi$ are stored. In the digital frequency modulator, the look-up table ROM is specified to have an input bit width of 10 bits for an address bit width, and an output bit width of 8 bits for a data bit width, and a clock signal of approximately 20 MHz, by which an operating speed is determined in the processing of video signals, is used. The details of the digital frequency modulator will be explained later.

However, the circuit for converting a phase signal to an amplitude signal has a disadvantage in that the Sine look-up table ROM is of a large memory capacity as much as 8 Kbits. Furthermore, it has another disadvantage in that an access to the look up table ROM having the input bit width of 10 bits becomes difficult in the use of the 20 MHz clock signal.

SUMMARY OF THE INVENTION

Accordingly, it is an object of this invention to provide a circuit for converting a phase signal to an amplitude signal, in which an input bit width and an output bit width of a Sine look-up table ROM are decreased to lower a memory capacity thereof.

It is a further object of this invention to provide a circuit for converting a phase signal to an amplitude signal, in which an operating speed is increased.

According to this invention, a circuit for converting a phase signal to an amplitude signal, comprises:

a signal separating and selecting circuit for providing a phase conversion signal and a sign signal in accordance with an input of a phase signal thereto, the phase conversion signal being a phase angle of the phase signal in a first state that the phase angle is in a reference phase angle range of a predetermined signal wave, while the phase conversion signal being a converted phase angle in the reference phase angle range, at which an amplitude of the predetermined signal wave is equal in its absolute value to an amplitude of the phase signal in a second state that the phase angle of the phase signal is outside the reference phase angle range, and the sign signal being a signal indicating whether a sign of the phase signal is different from a sign of the predetermined signal wave at the converted phase angle;

a conversion unit having a conversion table in which the predetermined signal wave is stored in the reference phase angle range, and from which an amplitude signal is read out in accordance with the phase conversion signal; and a sign modifying circuit for modifying a sign of the amplitude signal supplied thereto from the conversion unit in accordance with the sign signal, where the sign of the phase signal is different from the sign of the predetermined signal wave.

BRIEF DESCRIPTION OF THE DRAWINGS

This invention will be explained in more detail in conjunction with appended drawings, wherein.

DETAILED DESCRIPTION OF THE PREFERRED EMBODIMENTS

Figure 1:
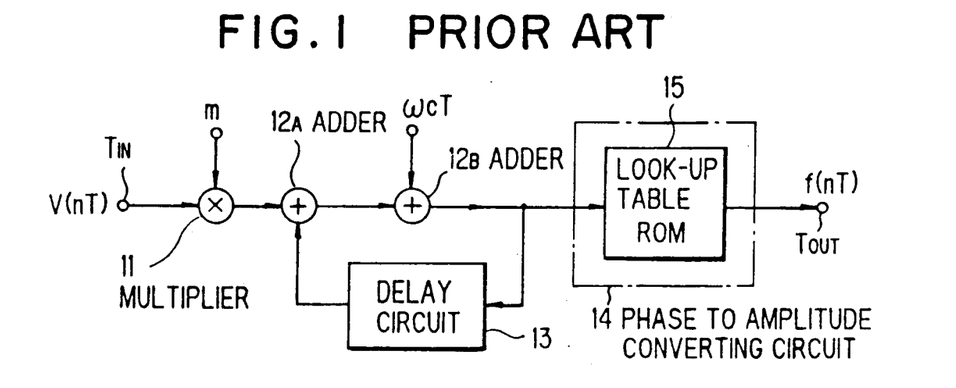
FIG. 1 is a block diagram showing a digital frequency modulator including a conventional circuit for converting a phase signal to an amplitude signal.
Figure 2:
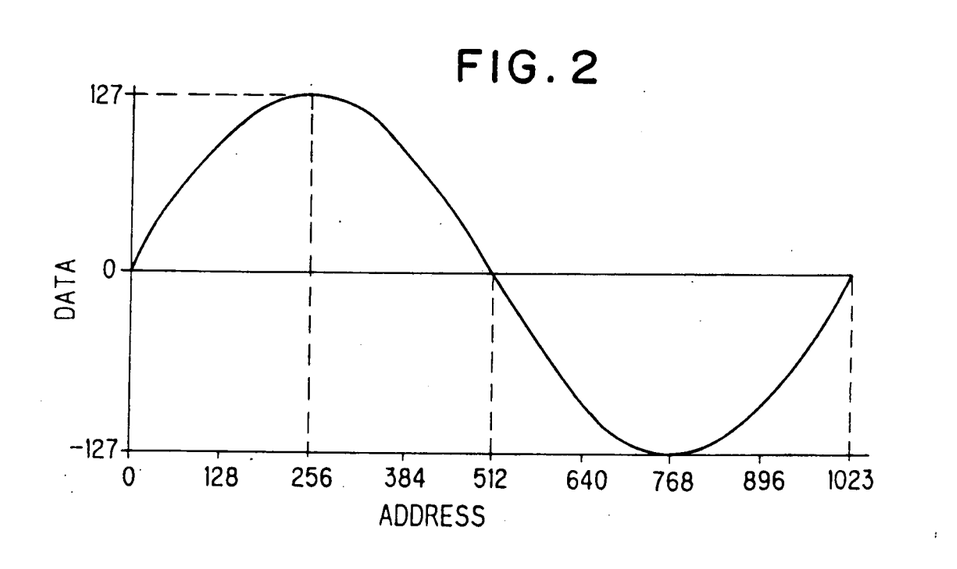
FIG. 2 is an explanatory diagram showing a look-up table ROM included in the conventional circuit for converting a phase signal to an amplitude signal.

Before explaining a circuit for converting a phase signal to an amplitude signal in the first preferred embodiment according to the invention, the aforementioned conventional circuit for converting a phase signal to an amplitude signal will be again explained in reference to FIGS. 1 and 2.

FIG. 1 shows the digital frequency modulator, in which the conventional circuit for converting a phase signal to an amplitude signal is included, comprising an input terminal $T_{IN}$, to which a digital signal V(nT) is applied, a multiplier 11 for multiplying the digital signal V(nT) by a constant value "m" of a modulation index, an adder $12_A$ for adding a first input signal which is an output signal of the multiplier 11 and a second input signal, an adder $12_B$ for adding an output signal of the adder $12_A$ and a constant value WcT, where Wc is a center angular frequency of a FM carrier, and T is a sampling interval, a delay circuit 13 for delaying an output signal of the adder $12_B$ to provide the second input signal of the adder $12_A$, and a phase-to-amplitude converting circuit 14 including a Sine look-up table ROM 15 for converting an output signal of the adder $12_B$ to an amplitude signal which is a digital FM signal f(nT), and an output terminal $T_{OUT}$, from which the digital FM signal f(nT) is supplied.

In operation, the digital signal V(nT) supplied to the input terminal $T_{IN}$ is multiplied in the multiplier 11 by the modulation index "m", so that the output signal of m·V(nT) is obtained in the multiplier 11. The output signal of m·V(nT) is supplied to a loop integral circuit composed of the adders 12$_A$ and 12$_B$ and the delay circuit 13, in which the output signal of m·V(nT) is integrated along with the constant value of WcT to provide a phase signal θ(nT) having information of a phase angle θ.

Accordingly, the phase signal θ(nT) is defined as follows:

$$\theta(nT) = \sum_{j=0}^{n-1} [WcT + m \cdot V(j - T)] \quad (1)$$

The phase signal θ(nT) is then converted to a digital FM signal f(nT) in the phase-to-amplitude converting circuit 14. Here, if it is assumed that the phase signal θ(nT) is of a binary digit of N bits, the phase-to-amplitude converting circuit 14 can be of the Sine look-up table ROM 15 representing a relation of A $$\sin\left(\frac{2\pi}{2^N} \theta + \theta_0\right),$$

where A is amplitude, θ is a phase input signal, and θ$_o$ is an arbitrary phase.

FIG. 2 shows a converting characteristic in the look-up table ROM 15, assuming that the bit number N is 10, the arbitrary phase θ$_o$ is 0, and the amplitude A is 127. As clearly shown therein, the look-up table ROM 15 stores data ranging from −127 to 127 along the vertical axis at addresses of 0 to 2 π ranging from 0 to 1023 along the horizontal axis.

Thus, the digital FM signal f(nT) is obtained at the output terminal T$_{OUT}$ as follows:

$$f(nT) = A \cdot \sin\left\{\frac{2\pi}{2^N} \cdot \sum_{j=0}^{n-1} [WcT + m V(nT)] + \theta_0\right\} \quad (2)$$

In the conventional circuit for converting a phase signal to an amplitude signal, however, the aforementioned disadvantages are resulted.

Next, a circuit for converting a phase signal to an amplitude signal in the first preferred embodiment according to the invention, which is included in the aforementioned digital frequency modulator, will be explained in FIG. 3, wherein like parts are indicated by like reference numerals as used in FIG. 1.

Figure 3:
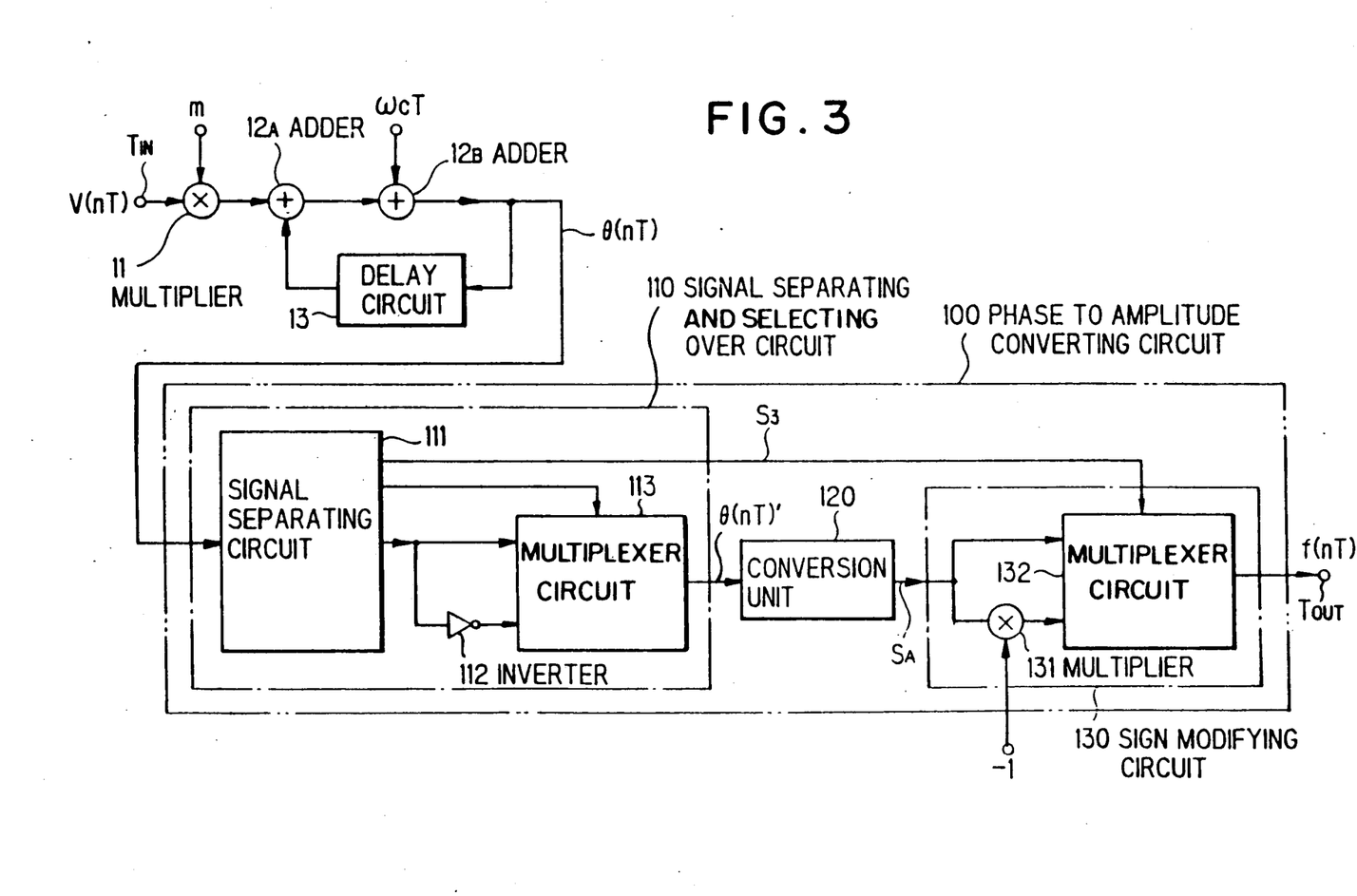
FIG. 3 is a block diagram showing a digital frequency modulator including a circuit for converting a phase signal to an amplitude signal in a first preferred embodiment according to the invention.

In FIG. 3, the circuit for converting a phase signal to an amplitude signal is shown by a phase to-amplitude converting circuit 100, which comprises a signal separating and selecting circuit 110, a conversion unit 120, and a sign modifying circuit 130.

The signal separating and selecting circuit 110 comprises a signal separating circuit 111, an inverter 112, and a multiplexer circuit 113 of conventional type, and supplies a phase conversion signal θ (nT)' to the conversion unit 120 by receiving the phase signal θ(nT) from the adder 12$_B$. All multiplexers used in the conversion circuit of this invention are of conventional 88 as CMOS IC standard published in 1988 in Japan. The phase conversion signal θ(nT)' is obtained by converting a phase angle of the phase signal θ(nT). Where the phase angle of the phase signal θ(nT) is in one of respective ranges in the table 1, the phase signal θ(nT) is converted to the phase conversion θ(nT)' having a phase angle indicated in the table 1.

TABLE 1

| PHASE ANGLE θ OF PHASE SIGNAL θ (nT) | PHASE ANGLE CONVERSION |
| --- | --- |
| θ ~ π/2 | NON-CONVERSION |
| π/2 ~ π | π-θ |
| π ~ 3π/2 | θ-π |
| 3π/2 ~ 2π | 2π-θ |

Furthermore, the signal separating and selecting circuit 110 supplies a sign signal Ss, which indicates whether or not an amplitude of the phase signal θ(nT) is equal in its sign to an amplitude of a reference signal having a phase angle range of 0 to π/2, to the sign modifying circuit 130.

Figure 4:
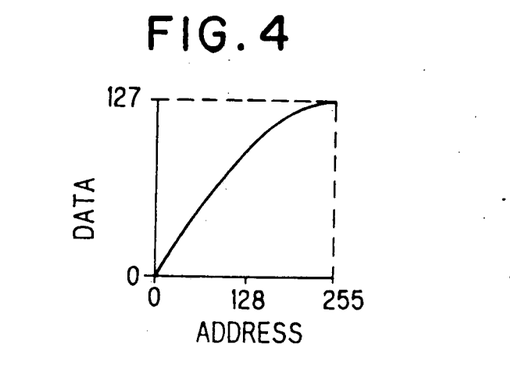
FIG. 4 is an explanatory diagram showing a look-up table ROM included in the circuit for converting a phase signal to an amplitude signal in the first preferred embodiment.

The conversion unit 120 stores a conversion table of a sinusoidal wave having a range of 0 to π/2 in the form of ROM as shown in FIG. 4, by which the phase conversion signal θ(nT)' is converted to an amplitude signal S$_A$.

The sign modifying circuit 130 comprises a multiplier 131 for multiplying the amplitude signal S$_A$ by a coefficient of "−1", and a multiplexer circuit 132 of conventional type for supplying a signal selected from the amplitude signal S$_A$ and an inverted signal which is obtained from the amplitude signal S$_A$ by inverting a sign thereof.

In operation, the digital signal V(nT) is applied to the input terminal T$_{IN}$, so that the phase signal θ(nT) is supplied from the adder 12$_B$ to the signal separating and selecting circuit 110 in the same manner as described in the conventional digital frequency modulator before.

Here, if it is assumed that the phase signal θ (nT) is of a binary digit of N bits "θ$_{N-1}$, θ$_{N-2}$, . . . θ$_1$, and θ$_o$", among which θ$_{N-1}$ is the MSB, and θ$_o$ is the LSB, and has information of a phase angle in a range of 0 to 2 π, the signal separating circuit 111 supplies the bit of θ$_{N-1}$ which is the sign signal S$_S$ to the sign modifying circuit 130, the bit of θ$_{N-2}$ which is a control signal for the swiching over circuit 113 to a control terminal of the swiching over circuit 113, and the bits of θ$_{N-3}$, . . . , θ$_1$, and θ$_o$ which are data to an input terminal of the inverter 112 and the multiplexer circuit 113.

Where the bit of θ$_{N-2}$ is "0", that is, the phase angle θ of the phase signal θ(nT) is in a range of 0 to π/2 and π to 3π/2, the multiplexer circuit 113 supplies the data of θ$_{N-3}$, . . . , θ$_1$ and θ$_o$, which are received directly from the signal separating circuit 111 as the phase conversion signal θ(nT)', to the conversion unit 120. On the other hand, where the bit of θ$_{N-2}$ is "1", that is, the phase angle θ of the phase signal θ(nT) is in a range of π/2 to π and 3π/2 to 2 π, the multiplexer circuit 113 supplies the data of θ$_{N-3}$, ... θ$_1$, and θ$_o$, which are inverted in the inverter 112 as the phase conversion signal θ (nT)', to the conversion unit 120. Thus, the phase signal θ(nT) is converted to the phase conversion signal θ(nT)' of (N-2) bits in consideration of a range selected from ranges 0 to π/2, π/2 to π, π to 3π/2 and 3π/2 to 2 π, to which the phase angle θ of the phase signal θ(nT) belongs.

In the conversion unit 120, the phase conversion signal θ(nT)' is considered to be a phase signal having a phase angle in a range of 0 to π/2, so that the amplitude signal S$_A$ is obtained by reading data at a corresponding address from the Sine look-up table ROM. In other words, the phase conversion signal θ(nT)' is converted to the amplitude signal $S_A$ in accordance with a conversion represented by $$A \cdot \sin\left(\frac{2\pi}{2^N} \cdot \theta' + \theta_0'\right),$$

where A is an amplitude, $\theta'$ is a phase angle of the phase conversion signal $\theta(nT)'$, and $\theta_o'$ is a phase angle which is half a resolution of the phase conversion signal $\theta(nT)'$ to be equal to $\pi/2^N$. The conversion characteristic of the conversion unit 120 is shown in FIG. 4, where the amplitude A is 127, the bit number N is 10.

In the sign modifying circuit 130, where the sign signal $S_S$ is "0", that is, the phase angle $\theta$ of the phase signal $\theta(nT)$ is in a range of 0 to $\pi$, the amplitude signal $S_A$ directly supplied from the conversion unit 120 is supplied through the multiplexer circuit 132 to the output terminal $T_{OUT}$. On the other hand, where the sign signal $S_S$ is "1", that is, the phase angle $\theta$ of the phase signal $\theta(nT)$ is in a range of $\pi$ to $2\pi$, the amplitude signal $S_A$ which is inverted in the multiplier 131 by multiplying "−1" thereto is supplied through the multiplexer circuit 132 to the output terminal $T_{OUT}$.

Here, if it is assumed that the bits of $\theta_{N-1}$ and $\theta_{N-2}$ are both "0", the phase signal $\theta(nT)$ has a phase angle $\theta$ which is in a range of 0 to $\pi/2$ (the reference phase angle range).

In this situation, the phase conversion signal $\theta(nT)'$ is of a signal including the bits of $\theta_{N-3}, \ldots, \theta_1$ and $\theta_o$, which is then converted in the conversion unit 120 to the amplitude signal $S_A$ of $$A \cdot \sin\left(\frac{2\pi}{2^N} \cdot \theta' + \theta_0'\right).$$

This amplitude signal $S_A$ is passed through the multiplexer circuit 132 without the modification of a sign in the sign modifying circuit 130, so that an output signal of the phase-to-amplitude converting circuit 100 is the amplitude signal $S_A$ of $$A \cdot \sin\left(\frac{2\pi}{2^N} \cdot \theta' + \theta_0'\right).$$

On the other hand, if it is assumed that the bit of $\theta_{N-1}$ is "0", while the bit of $\theta_{N-2}$ is "1", the phase angle $\theta$ of the phase signal $\theta(nT)$ is in a range of $\pi/2$ to $\pi$.

In this situation, the phase conversion signal $\theta(nT)'$ is a signal of the bits $\theta_{N-3}, \ldots \theta_1$ and $\theta_o$.

Accordingly, the equation (3) is obtained, because the bits of $\theta_{N-1}$ and $\theta_{N-2}$ are "0" and "1", respectively.

$$\begin{aligned}[\theta_{N-3}, \ldots, \theta_1, \theta_0] &= 2^{N-2} - [\theta_{N-3}, \ldots, \theta_1, \theta_0] - 1 \\ &= 2^{N-1} - [\theta_{N-1}, \ldots, \theta_1, \theta_0] - 1 \\ &= 2^{N-1} - \theta - 1\end{aligned} \quad (3)$$

Therefore, the amplitude signal $S_A$ of the conversion unit 120 is defined in the equation (4).

$$\begin{aligned}S_A &= A \cdot \sin\left[\frac{2\pi}{2^N} \cdot [\theta_{N-3}, \ldots, \theta_1, \theta_0] + \theta_0'\right] \\ &= A \cdot \sin\left[\frac{2\pi}{2^N} \cdot (2^{N-1} - \theta - 1) + \theta_0'\right] \\ &= A \cdot \sin\left[\pi - \frac{2\pi}{2^N} \cdot (\theta + 1) + \theta_0'\right] \\ &= A \cdot \sin\left[\frac{2\pi}{2^N} \cdot (\theta + 1) - \theta_0'\right] \\ &= A \cdot \sin\left[\frac{2\pi}{2^N} \cdot \theta + \frac{2\pi}{2^N} - \theta_0'\right]\end{aligned} \quad (4)$$

This amplitude signal $S_A$ is directly the output signal $f(nT)$ of the phase to amplitude conversion circuit 100.

Here, if it is assumed that the equations (5) and (6) are met, the right side R of the equation (4) is defined in the equation (7).

$$\frac{2\pi}{2^N} - \theta_0' = \theta_0' \quad (5)$$

$$\therefore \theta_0' = \frac{\pi}{2^N} \quad (6)$$

$$R = A \cdot \sin\left(\frac{2\pi}{2^N} \theta + \theta_0'\right) \quad (7)$$

Furthermore, if it is assumed that the bit of $\theta_{N-1}$ is "1", while the bit of $\theta_{N-2}$ is "0", the phase angle $\theta$ of the phase signal $\theta(nT)$ is in a range of $\pi$ to $3\pi/2$. Therefore, the equations (8) and (9) are obtained in the same manner as above.

$$\begin{aligned}\theta' &= [\theta_{N-3}, \ldots, \theta_1, \theta_0] \\ &= \theta - 2^{N-1}\end{aligned} \quad (8)$$

$$\begin{aligned}A \cdot \sin\left(\frac{2\pi}{2^N} \cdot \theta + \theta_0'\right) &= A \cdot \sin\left(\frac{2\pi}{2^N} \cdot \theta - \pi + \theta_0'\right) \\ &= -A \cdot \sin\left(\frac{2\pi}{2^N} \cdot \theta + \theta_0'\right)\end{aligned} \quad (9)$$

In this situation, the amplitude signal $S_A$, which is multiplied in the multiplier 131 by the coefficient of "−1", is passed through the multiplexer circuit 132, because the bit of $\theta_{N-1}$ is "1". As a result, the output signal $f(nT)$ of the phase to amplitude conversion circuit 100 is obtained as defined in the equation (10).

$$f(nT) = A \cdot \sin\left(\frac{2\pi}{2^N} \theta + \theta_0'\right) \quad (10)$$

where the bits of $\theta_{N-1}$ and $\theta_{N-2}$ are both "1", the output signal $f(nT)$ of the phase-to-amplitude conversion circuit 100 is also obtained as defined in the equation (11).

$$f(nT) = A \cdot \sin\left(\frac{2\pi}{2^N} \cdot \theta + \theta_0'\right) \quad (11)$$

As understood from the above, the phase-to-amplitude conversion circuit 100 is realized to operate in the same manner as the conventional circuit for converting a phase signal to an amplitude signal, in spite that a memory capacity of the look- up table ROM is decreased by one-eighth, because two bits are decreased in the input bit width, and one bit is decreased in the output bit width.

In the first preferred embodiment, although the offset value $\theta_o'$ of the phase conversion signal $\theta(nT)'$ supplied to the look-up table ROM of the conversion unit 120 is limited as defined in the equation (6), no problem occurs in converting a phase signal to an amplitude signal.

Figure 5:
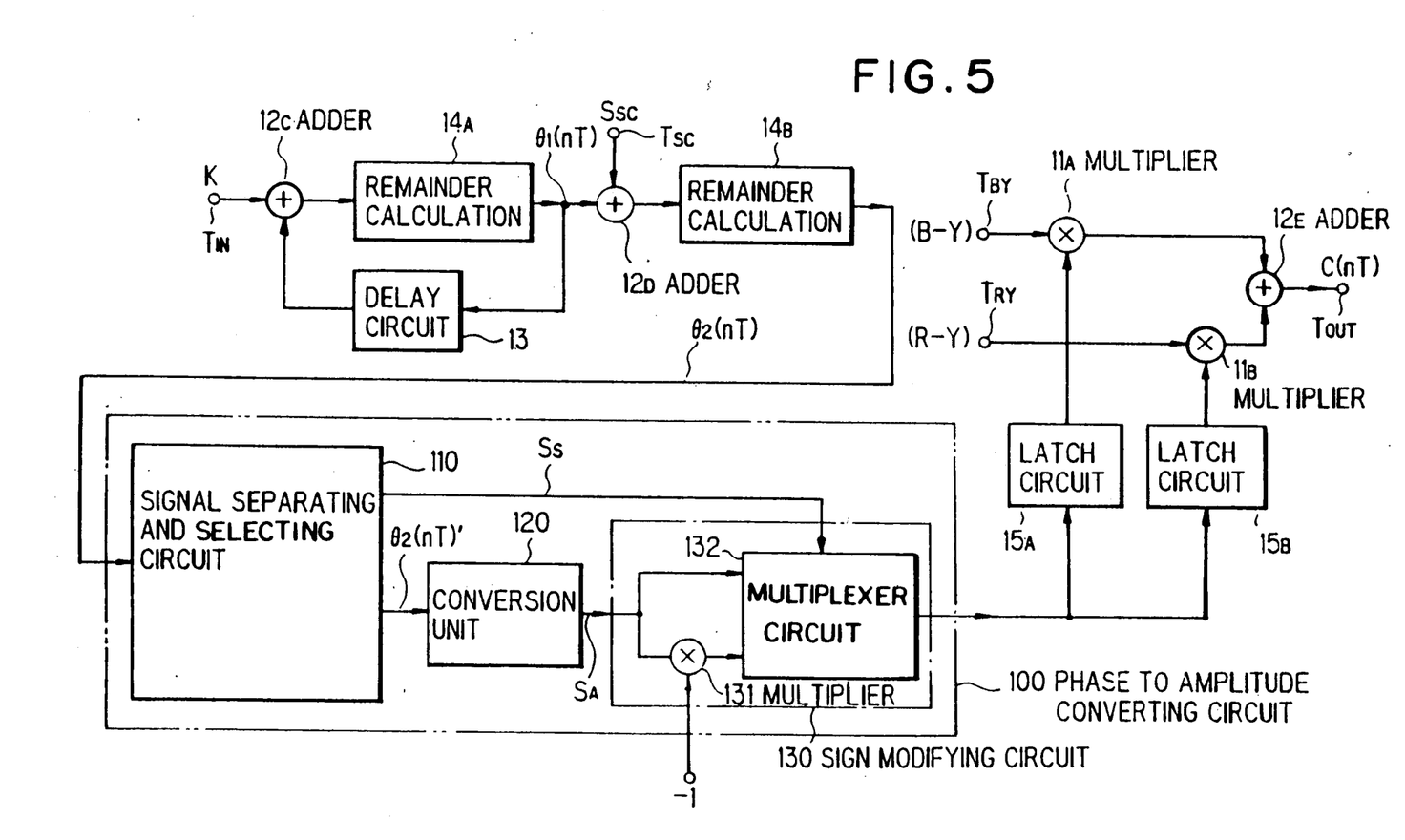
FIG. 5 is a block diagram showing a digital color encoder including a look-up table ROM in a second preferred embodiment according to the invention.

FIG. 5 shows a circuit for converting a phase signal to an amplitude signal in the second preferred embodiment according to the invention which is included in a digital color encoder. The digital color encoder comprises an input terminal $T_{IN}$, to which a constant value of "K" is applied, an adder $12_C$ for adding the constant value "K" and a delayed signal which is explained later, a remainder calculation circuit $14_A$ for carrying out a predetermined remainder calculation of an output signal of the adder $12_C$, a delay circuit $13_A$ for delaying an output signal of the remainder calculation circuit $14_A$ to provide the delayed signal, an adder $12_D$ for adding the output signal of the remainder calculation circuit $14_A$ and a Sine/Cosine control signal $S_{SC}$ applied to an input terminal $T_{SC}$, a remainder calculation circuit $14_B$ for carrying out a predetermined remainder calculation of an output signal of the adder $12_D$, a phase to amplitude conversion circuit 100 which will be explained later, latch circuits $15_A$ and $15_B$ for latching an output signal of the phase-to-amplitude conversion circuit 100, a multiplier $11_A$ for multiplying multiplying a latched signal of the latch circuit $15_A$ by a color-difference signal (B-Y) applied to an input terminal $T_{BY}$, a multiplier $11_B$ by a color-difference signal (R-Y) applied to an input terminal $T_{RY}$, and an adder $12_E$ for adding output signals of the multipliers $11_A$ and $11_B$ to provide a digital color encoder output signal $C(nT)$ which is supplied from an output terminal $T_{OUT}$ to a following stage.

The phase-to-amplitude conversion circuit 100 includes a signal separating and selecting circuit 110 for providing a sign signal $S_S$ and a phase conversion signal $\theta(nT)'$ by receiving a phase signal $\theta_2(nT)$ from the remainder calculation circuit $14_B$, a conversion unit 120 including a look-up table ROM for converting the phase conversion signal $\theta_2(nT)'$ to an amplitude signal $S_A$, and a sign modifying circuit 130 including a multiplier 131 for multiplying the amplitude signal $S_A$ by a coefficient of "$-1$" and a switching-over multiplexer circuit 132 for selecting a signal from the amplitude signal $S_A$ and an amplitude signal inverted in the multiplier 131 to provide the selected signal to the latch circuits $15_A$ and $15_B$.

Figure 6:
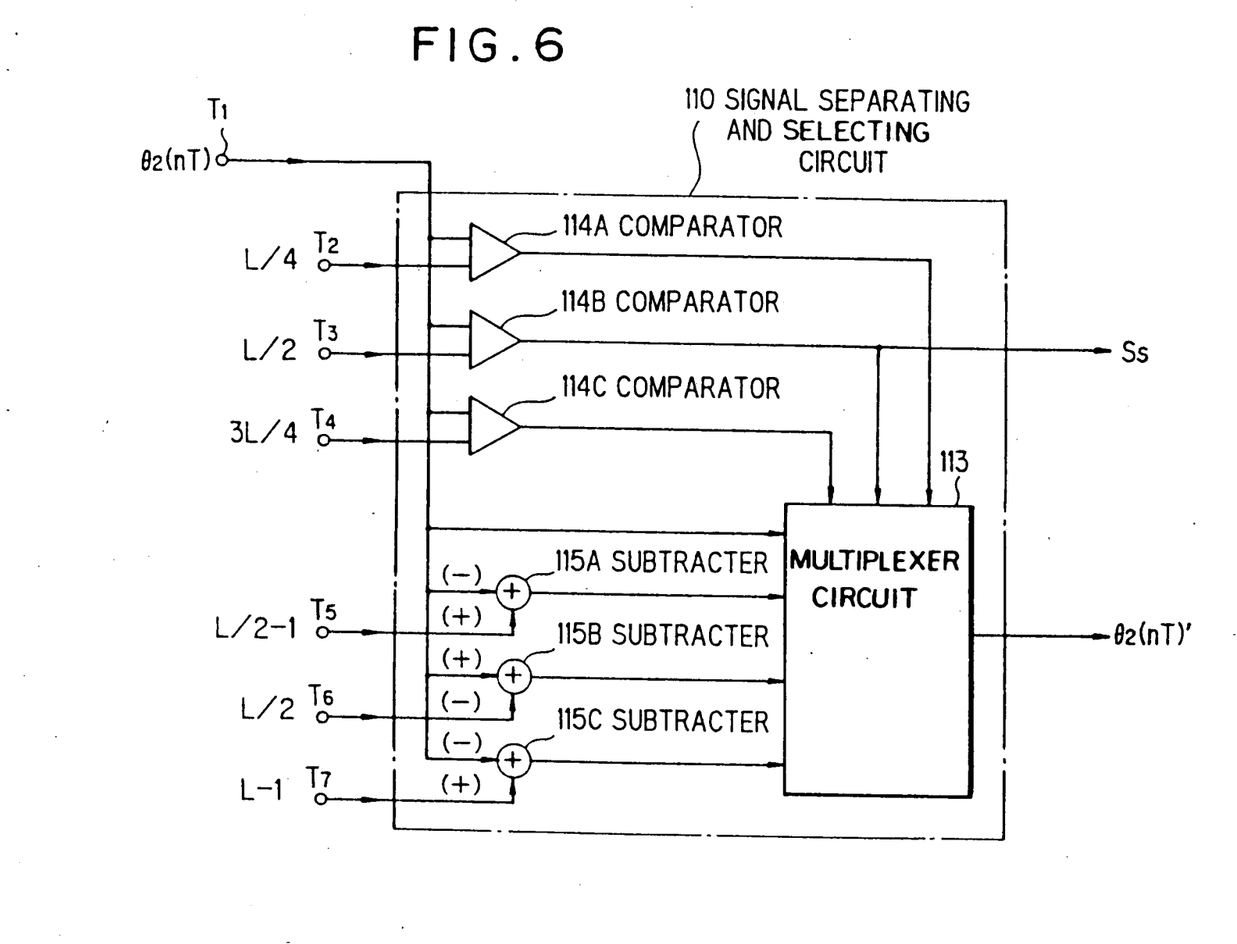
FIG. 6 is a block diagram showing a signal separating circuit included in the circuit for converting a phase signal to an amplitude signal in the second preferred embodiment.

FIG. 6 shows the signal separating and selecting circuit 110 included in the phase to amplitude conversion circuit 100, where a ratio between a sub-carrier frequency $f_{SC}$ to be color-encoded and a sampling frequency f is K/L (K:L). Here, K is a natural number, and L is a binary digit of N bits and a natural number of a multiple of four. The signal separating and selecting circuit 110 comprises comparators $114_A$, $114_B$ and $114_C$, first input terminals of which are connected to an input terminal $T_1$ for receiving the phase signal $\theta_2(nT)$, and second input terminals of which are connected to corresponding input terminals $T_2$, $T_3$ and $T_4$ for receiving constant values of "L/4", "L/2" and 3L/4", respectively, subtracters $115_A$, $115_B$ and $115_C$, first input terminals of which are connected to the input terminal $T_1$ for receiving the phase signal $\theta_2(nT)$, and second input terminals of which are connected to corresponding input terminals $T_5$, $T_6$ and $T_7$ for receiving constant values of "L/2−1", "L/2" and "L−1", respectively, and a multiplexer circuit 113 a for selecting a signal from the phase signal $\theta_2(nT)$, and output signals of the subtracters $115_A$, $115_B$ and $115_C$ in accordance with comparison results of the comparators $114_A$, $114_B$ and $114_C$.

In operation, the constant value "K" is supplied to the input terminal $T_{IN}$, and is integrated in an integral circuit including the adder $12_C$, the remainder calculation circuit $14_A$ and the delay circuit $13_A$ to provide the phase signal $\theta_1(nT)$ to the adder $12_D$. In the remainder calculation circuit $14_A$, a remainder calculation is carried out in accordance with the constant value of "L". Therefore, the phase signal $\theta_1$ (nT) is defined in the equation (12).

$$\theta_1(nT) = n \cdot k \text{ modulo } L \quad (12)$$

Then, the Sine/Cosine signal of "0" is applied to the input terminal $T_{SC}$ connected to the adder $12_D$, where an output signal of the phase to amplitude conversion circuit 100 corresponds to a Cosine value. In the latter case, the phase signal $\theta_1(nT)$ is added in the adder $12_D$ by the value of "L/4", thereby leading a phase of the phase signal $\theta_1(nT)$ by $\pi/2$, so that a Sine value is converted to a Cosine value in the state that the value 0 to L of the phase signal $\theta_1(nT)$ corresponds to a phase angle of 0 to $2\pi$. The output signal of the adder $12_D$ is supplied to the remainder calculation circuit $14_B$, in which a remainder calculation is carried out in accordance with the constant value of "L". As a result, an output signal of the remainder calculation circuit $14_B$ is a phase signal $\theta_2(nT)$ resulted from a conversion of the output signal of the adder $12_D$ to values of 0 to (L−1). The phase signal $\theta_2(nT)$ is supplied to the phase-to-amplitude conversion circuit 100, in which the sign signal $S_S$ and the phase conversion signal $\theta_2(nT)'$ are obtained depending on a phase angle $\theta_2$ of the phase signal $\theta_2(nT)$ in the signal separating and multiplexer circuit 110 as shown in the table 2.

TABLE 2

| PHASE ANGLE $\theta_2$ OF PHASE SIGNAL $\theta_2(nT)$ | SIGN SIGNAL SS | PHASE ANGLE $\theta_2$ OF PHASE SIGNAL $\theta_2(nT)'$ |
|---|---|---|
| $0 \leq \theta_2 < L/4$ | 0 | $\theta_2$ |
| $L/4 \leq \theta_2 < L/2$ | 0 | $L/2 - \theta_2 - 1$ |
| $L/2 \leq \theta_2 < 3L/4$ | 1 | $\theta_2 - L/2$ |
| $3L/4 \leq \theta_2 < L$ | 1 | $L - \theta_2 - 1$ |

In the conversion unit 120, a conversion represented by $$A \cdot \sin\left(\frac{2\pi}{2^N} \cdot \theta_2' + \theta_0''\right)$$

is carried out, where A is an amplitude, and $\theta_o''$ is a phase which is half a resolution of a phase input signal represented by $\theta_2'$ and is equal to $\pi/2^N$.

Figure 7A:
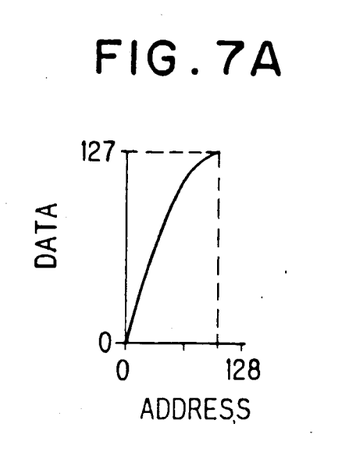
FIG. 7A is an explanatory diagram showing a look-up table ROM included in the circuit for converting a phase signal to an amplitude signal in the second preferred embodiment.

FIG. 7A shows a conversion characteristic of the conversion unit 120, wherein the amplitude A is 127, the bit number N is 9, and the value L is 400. The amplitude signal $S_A$ which is thus obtained in the conversion unit 120 is modified in its sign depending on a content of the sign signal $S_S$, as explained in the first preferred embodiment. Consequently, tho Sine and Cosine values of an oscillation signal having a predetermined frequency of the color sub-carrier are obtained at the output terminal of the phase to amplitude conversion circuit 100. The output signal of the phase to amplitude conversion circuit 100 is latched in the latch circuits $15_A$ and $15_B$, so that the latched signals are processed in a calculation circuit including the multipliers $11_A$ and $11_B$, to which the color-difference signals (B Y) and (R-Y) are supplied along with the latched signals, respectively, and the adder $12_E$, to which the multiplied results are supplied, thereby providing the color signal C(nT) at the output terminal $T_{OUT}$ as defined in the equation (13).

$$C(nT) = (B - Y) \cdot \sin\left[\frac{2\pi}{L} \cdot \theta_1(nT) + \theta_0''\right] + \qquad (13)$$

$$(R - Y) \cos\left[\frac{2\pi}{L} \cdot \theta_1(nT) + \theta_0''\right]$$

Figure 7B:
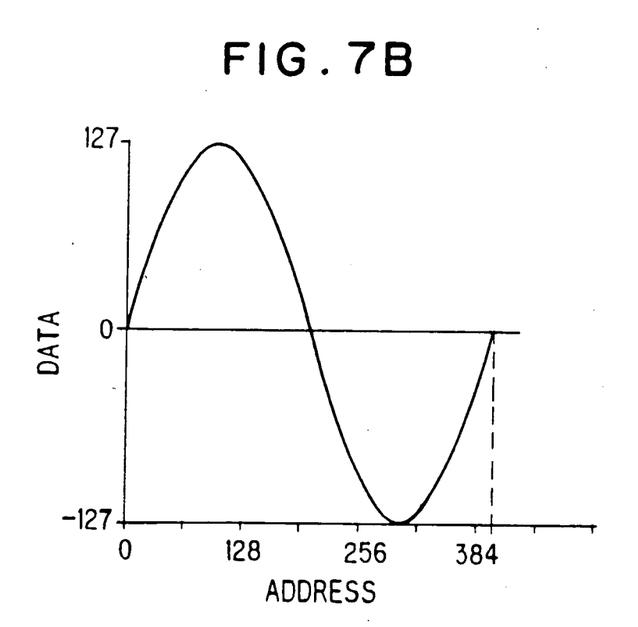
FIG. 7B is an explanatory diagram showing a conventional look-up table ROM, to which the look-up table ROM of FIG. 7A is compared in its memory capacity.

In this manner, even if a value of a phase signal which is in a range of 0 to $2\pi$ is not a value which is an exponent of $2(2^N)$, the present invention can be embodied. In a conventional digital color encoder, although a look-up table ROM is required to be provided in a conversion unit as shown in FIG. 7B, the look up table ROM becomes small in the second preferred embodiment as shown in FIG. 7A. That is, two bits are decreased in an input bit width, and one bit is decreased in an output bit width.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is

1. A circuit for converting a phase signal to an amplitude signal, comprising:
    a signal separating and selecting circuit receiving a phase signal at an input thereof and providing a phase conversion signal and a sign signal in accordance with the phase signal supplied thereto, wherein said phase conversion signal is obtained by converting a phase angle of said phase signal provided in a reference phase range of a predetermined signal wave into a converted phase angle in said reference phase angle range, at which an amplitude of said predetermined signal wave is equal in its absolute value to an amplitude of a phase signal having a phase angle outside said reference phase angle range, and said sign signal is a signal indicating whether a sign of said phase signal is different from a sign of said predetermined signal wave at said converted phase angle;
    a conversion unit connected to said signal separating and selecting circuit and having a conversion table storing said predetermined signal wave in said reference phase angle range, and converting said phase conversion signal into an amplitude signal read out from said conversion unit in accordance with said phase conversion signal; and
    a sign modifying circuit connected to said conversion unit and operated to modify a sign of said amplitude signal supplied from said conversion unit in accordance with said sign signal when said sign of said phase signal is different from said sign of said predetermined signal wave.

2. A circuit for converting a phase signal to an amplitude signal according to claim 1, wherein said conversion table is composed of a read only memory for storing said predetermined signal wave of a sinusoidal wave in said reference phase angle range of 0 to $\pi/2$.

3. A circuit for converting a phase signal to an amplitude signal according to claim 2, wherein said sign modifying circuit includes:
    means for modifying said sign of said amplitude signal to provide a sign-modified amplitude signal when said phase angle of said phase signal is in a phase angle range of $\pi$, and
    a multiplexer circuit for passing said amplitude signal supplied directly from said conversion unit when said phase angle of said phase signal is in a phase angle range of 0 to $\pi$ and for passing said sign-modified amplitude signal therethrough when said phase angle of said phase signal is in a phase angle range of $\pi$ to $2\pi$.

4. A circuit for converting a phase signal to an amplitude signal according to claim 1, wherein said signal separating and selecting circuit includes:
    a plurality of comparators for comparing said phase signal received at said input with a plurality of control signals;
    a plurality of subtracters inputting said phase signal and each operated to carry out subtraction between said phase signal and one of a plurality of respective reference signals; and
    a multiplexer circuit connected to said comparators and to said subtracters and selecting the phase conversion signal in accordance with output signals of said subtracters and said control signals.

5. A circuit for converting a phase signal to an amplitude signal according to claim 1, which is incorporated in a system selected from the group consisting of a digital FM modulator and a digital color encoder.

* * * * *